Figure 1:
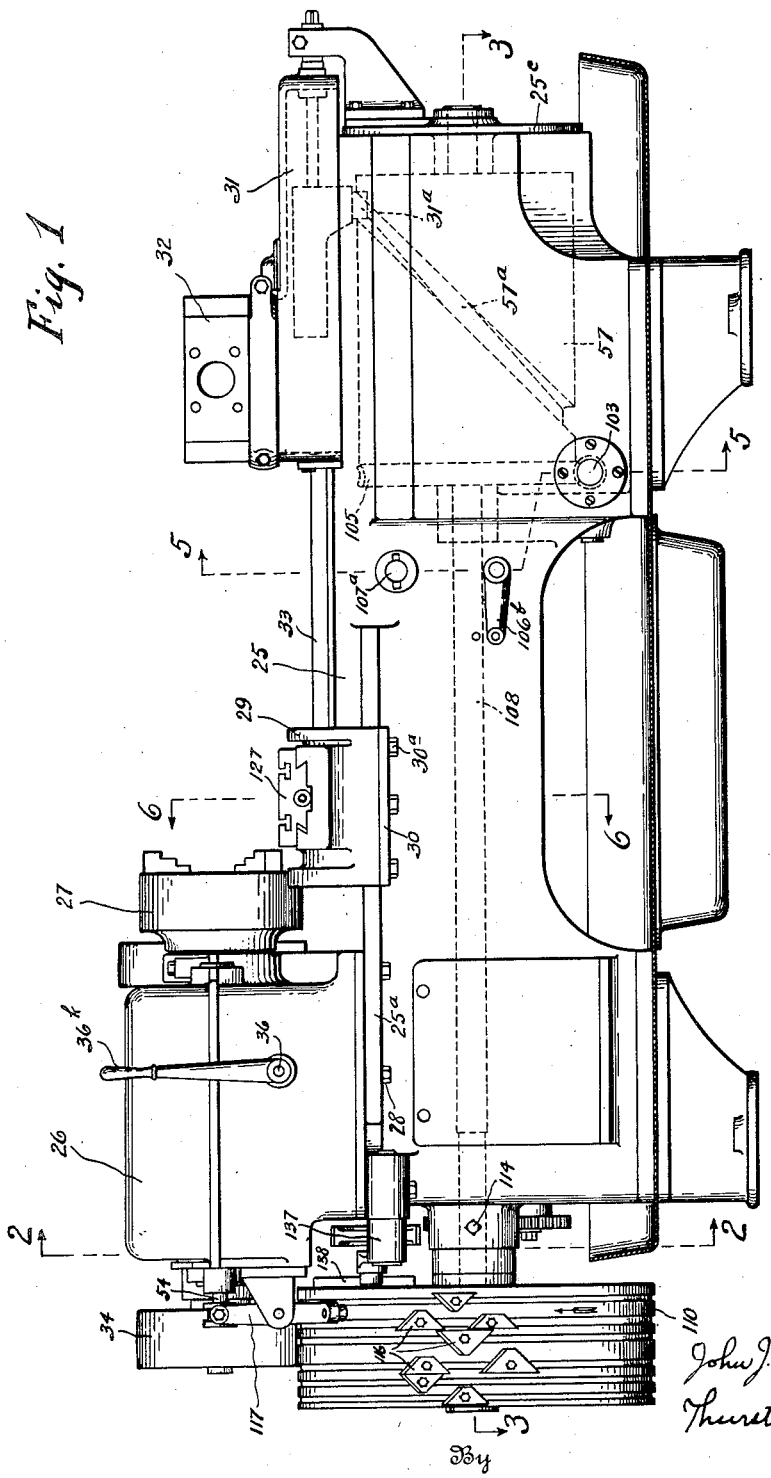

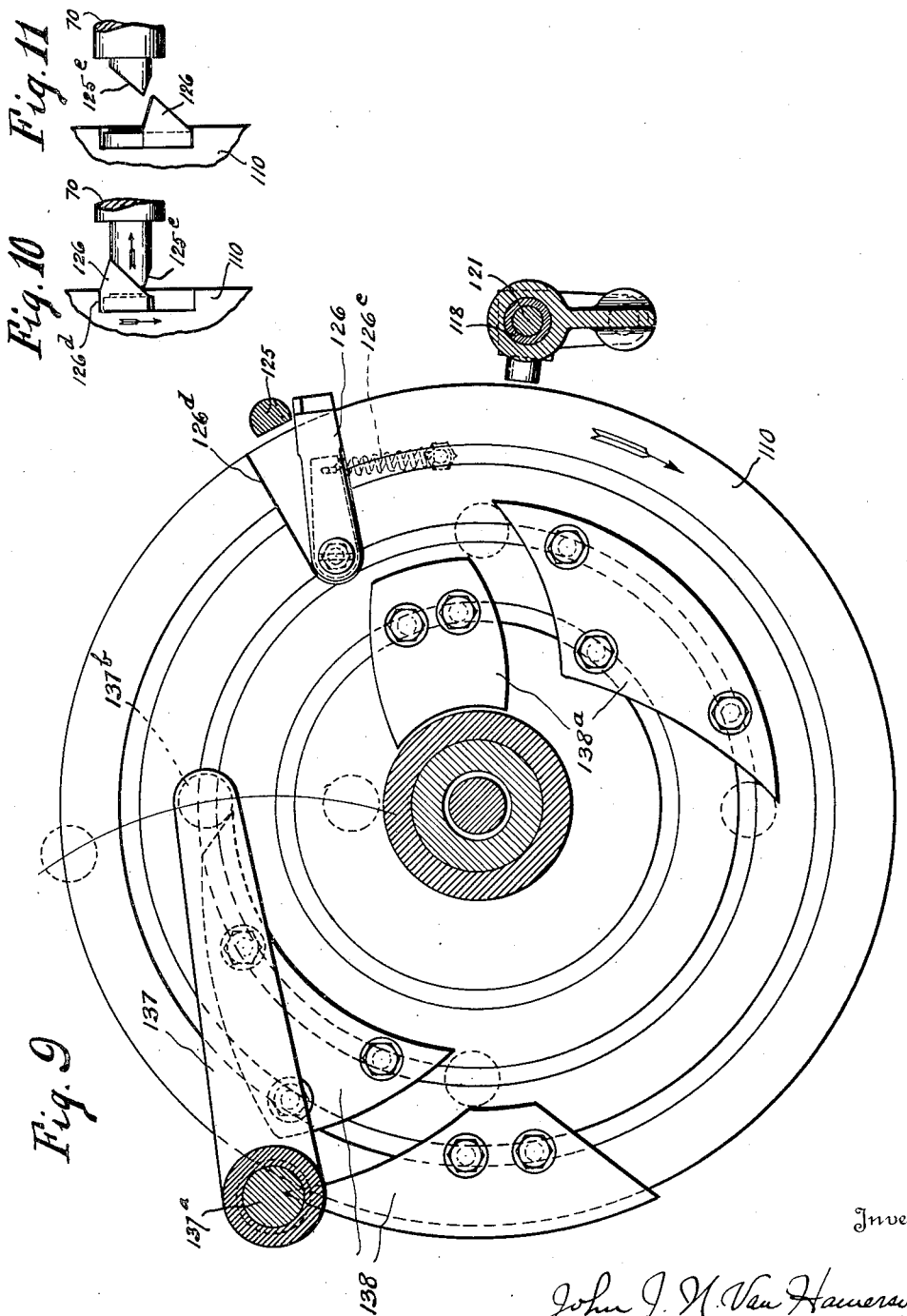

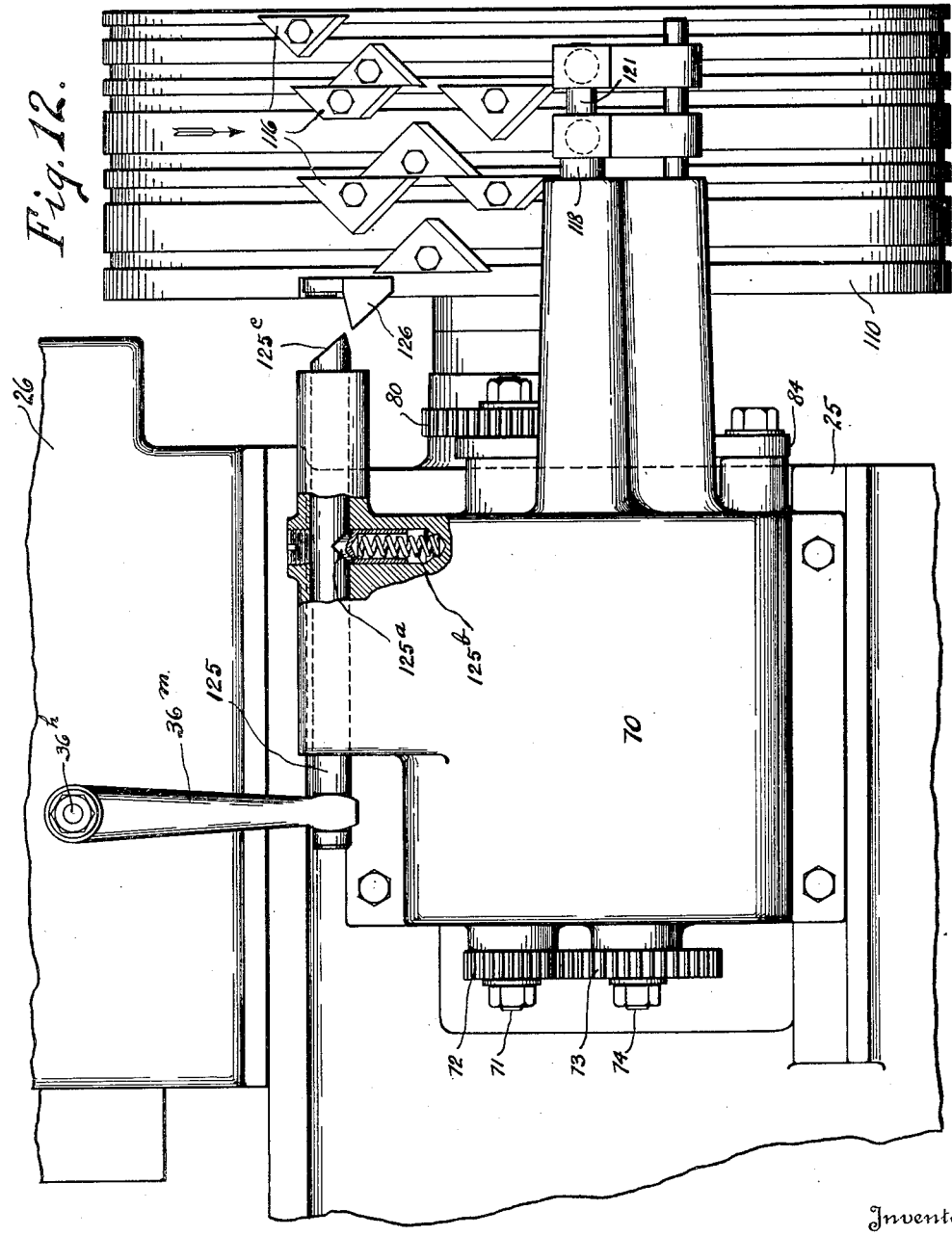

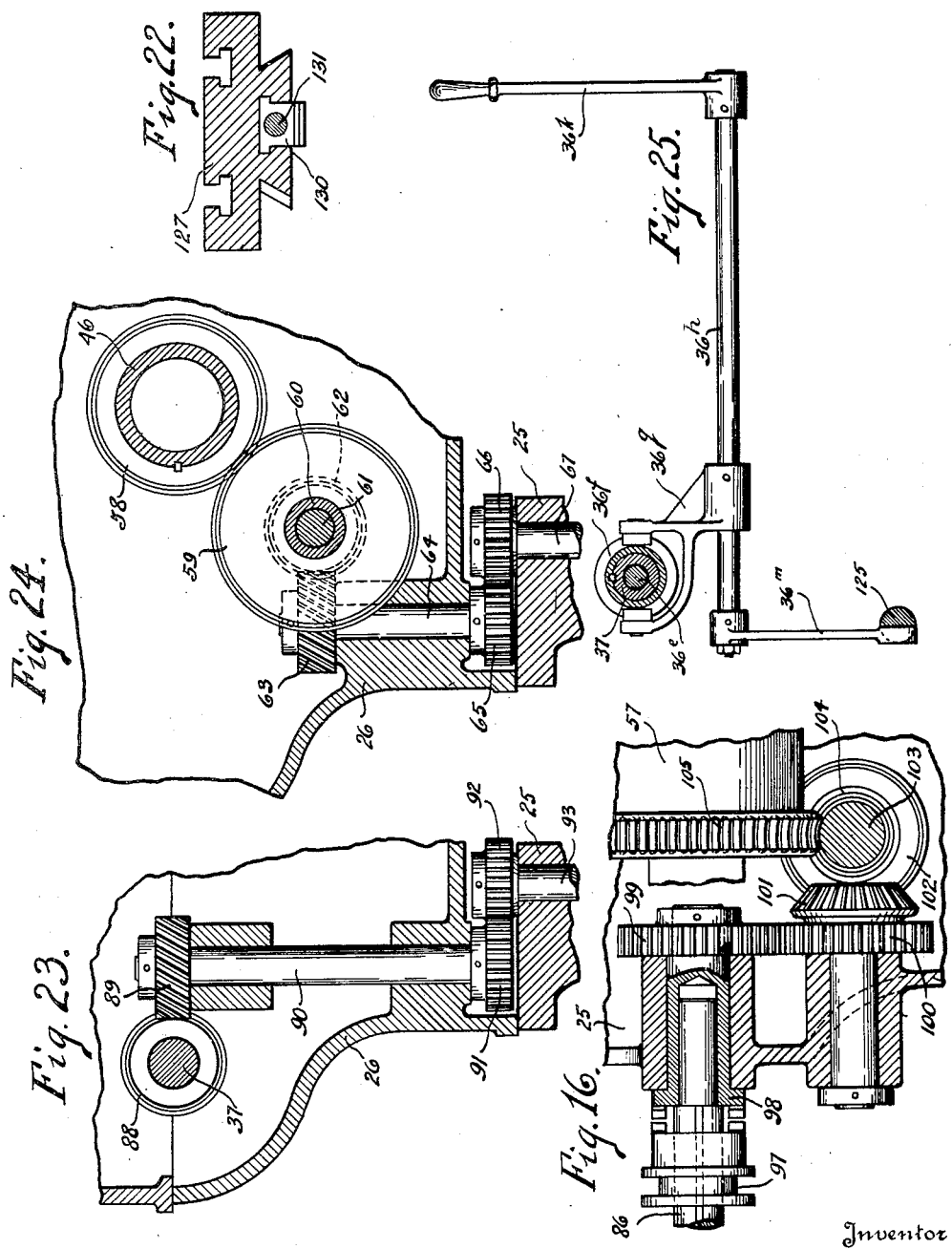

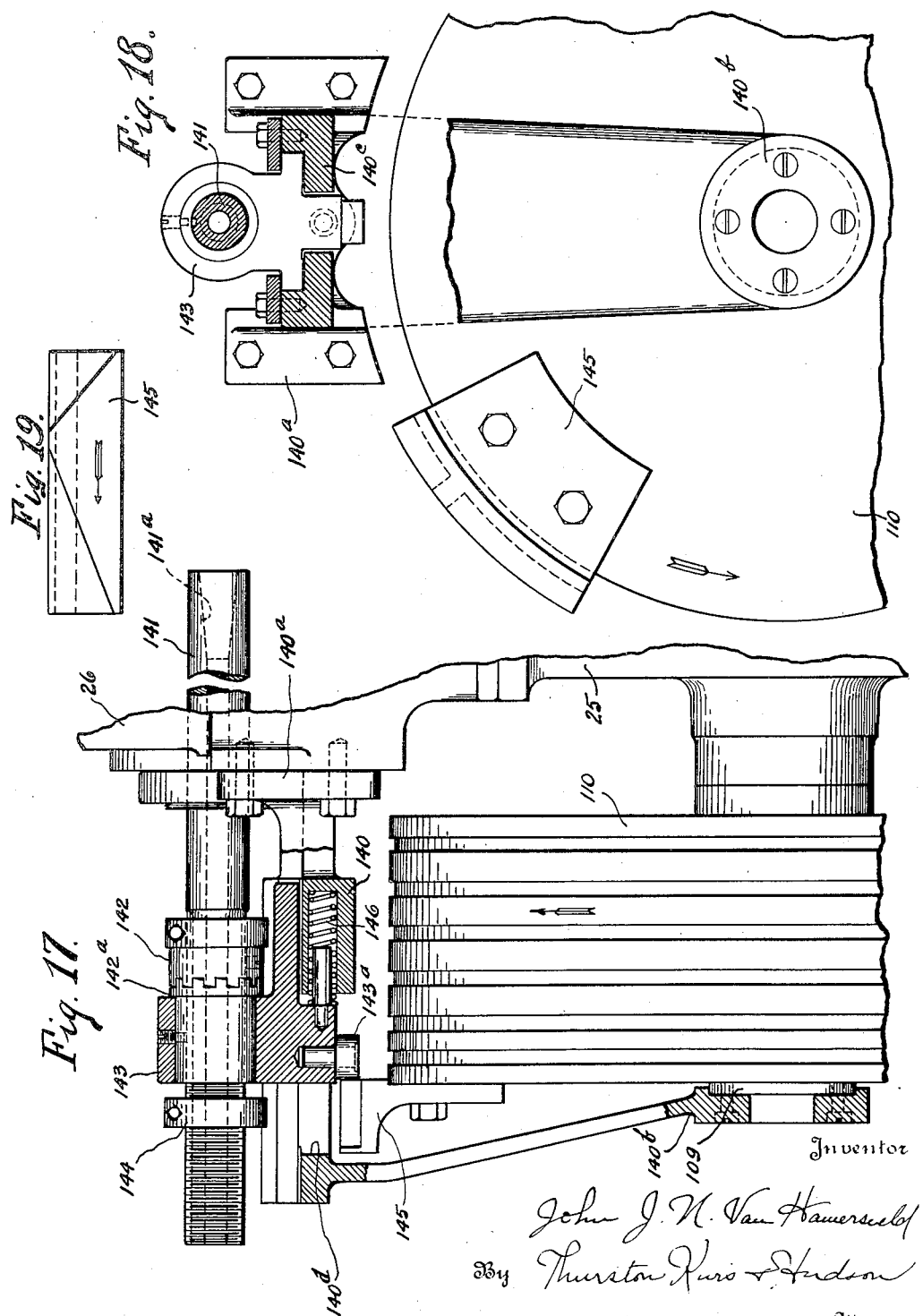

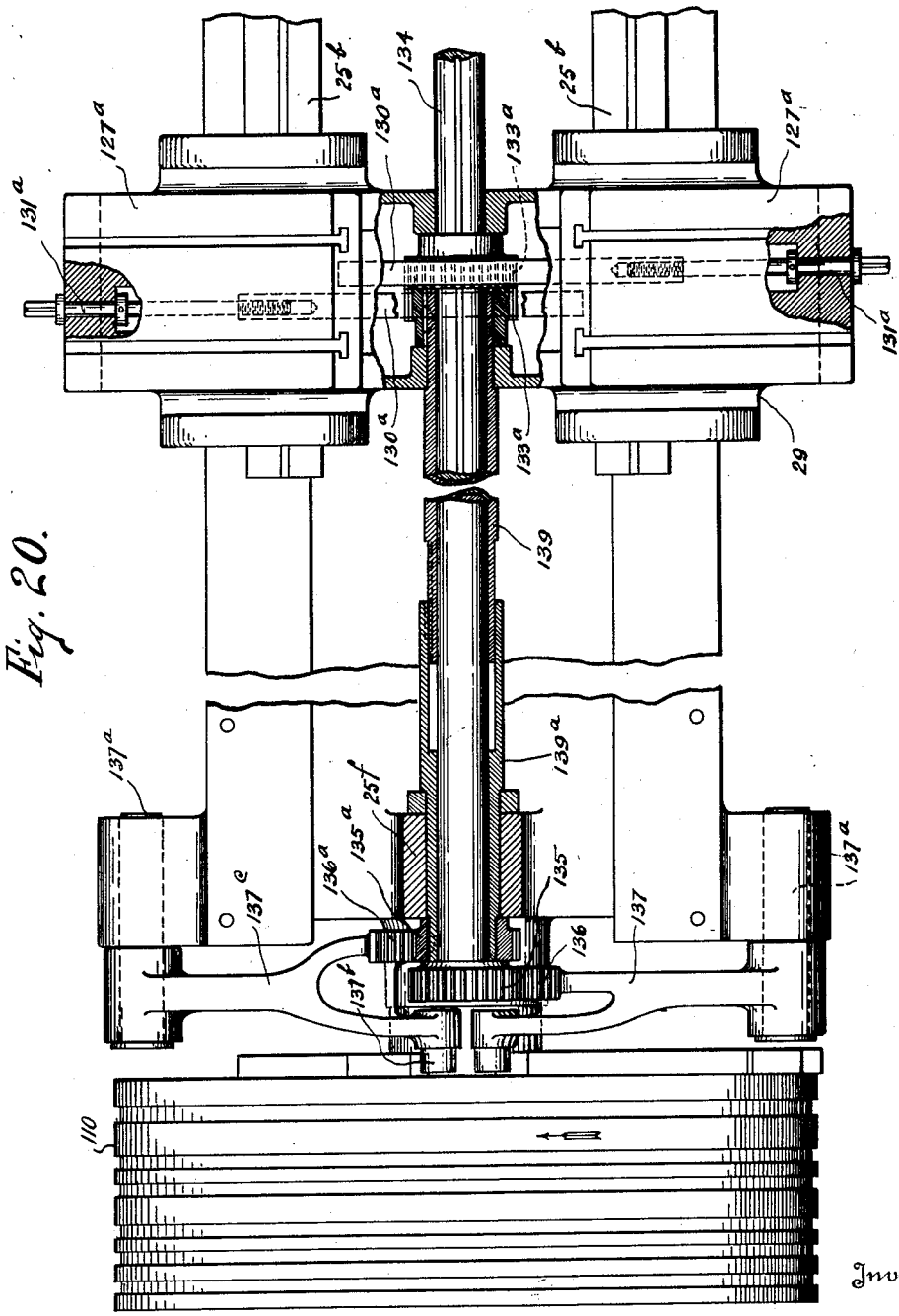

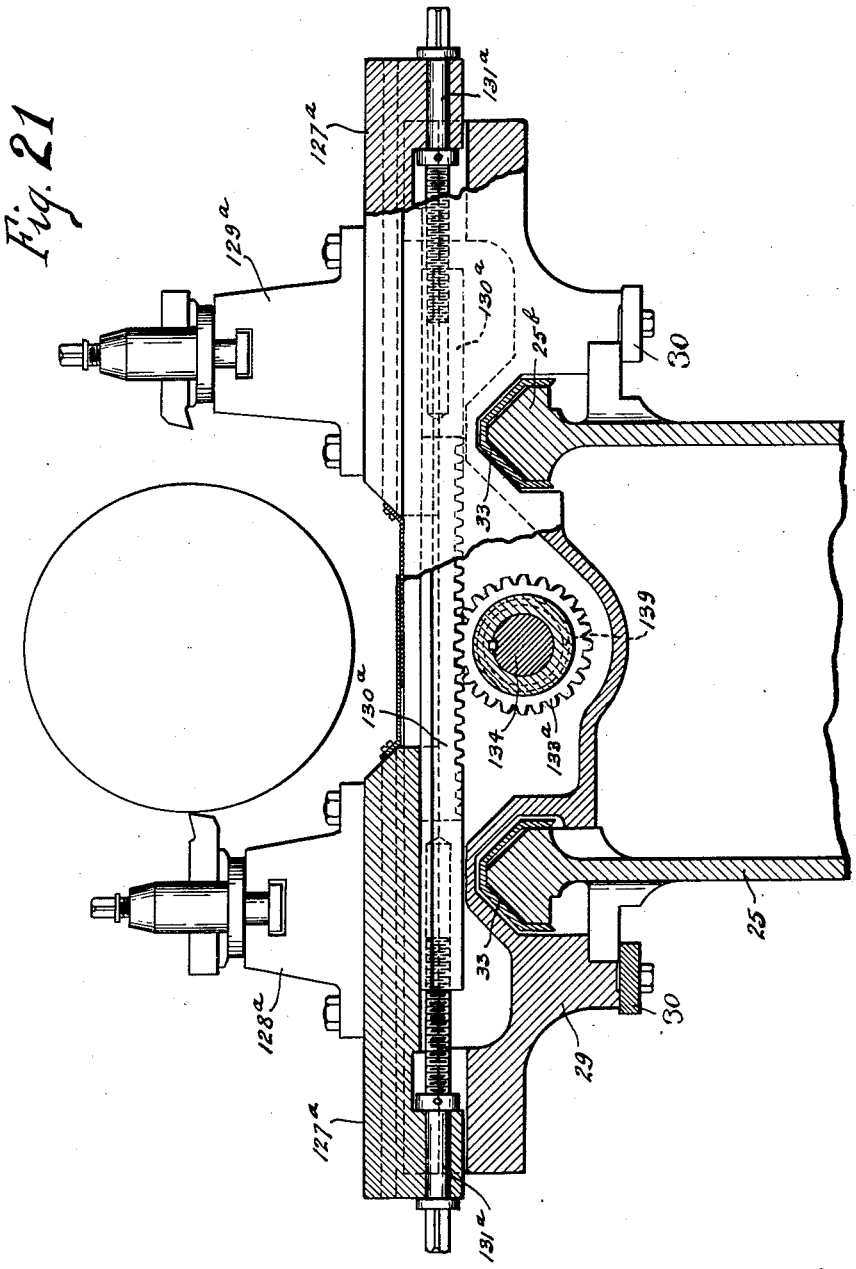

Patented Nov. 13, 1928.

1,691,595

UNITED STATES PATENT OFFICE.

JOHN J. N. VAN HAMERSVELD, OF CLEVELAND, OHIO, ASSIGNOR TO THE WARNER AND SWASEY COMPANY, OF CLEVELAND, OHIO, A CORPORATION OF OHIO.

AUTOMATIC SINGLE-SPINDLE-CHUCKING MACHINE.

Application filed August 11, 1924. Serial No. 731,409.

This invention relates to metal working machines and particularly to a single spindle automatic chucking machine of the type having a head supporting a work spindle with a work holding chuck, said work spindle adapted to be driven at a plurality of different speeds, a reciprocating tool holder preferably in the form of a turret on a slide adapted to be reciprocated toward and from the chuck at a plurality of different speeds, and one or more additional tool holders supported on one or more cross slides adapted to be actuated at different speeds, the different tool holders operating in predetermined timed relation and being operated along with the work spindle by a single driving element.

Single spindle automatic chucking machines of this general type are old and well known, and the present invention relates particularly to important details of construction and arrangement of units and parts whereby advantages in construction and operation are obtained.

The principal object of the invention is to improve the efficiency and operation of the machines, to simplify the construction thereof, and reduce their cost of manufacture.

More specifically considered, it is aimed to simplify the construction so as to eliminate all unnecessary parts; to construct and arrange the parts so as to obtain in most instances direct and positive action and control, to construct and arrange the parts so as to obtain rigidity of support and to provide to as great extent as possible what may be termed "unit construction" by which is meant that a series of co-operating or closely associated parts can be arranged in unit form, and as a unit applied to and removed from the machine, thus reducing the cost of construction, and the ease of assembly or disassembly, as for example, when it is necessary to make changes or repairs, or to alter the machine to adapt it for work of different kinds.

Another of the more specific objects is to provide a construction wherein there is secured to a maximum degree the feature of durability.

Another of the more specific objects is to arrange the controlling elements, such as the tappets and cams which control the automatic functions, and to which access must be had from time to time, as when arranging a set-up, in a manner such as to provide accessibility, and preferably to localize all these parts on a single member so that the machine can be set up and operated conveniently and efficiently with the expenditure of a minimum of time by the operator.

The above and other objects are accomplished by my invention, which may be here briefly summarized as consisting in certain novel details of construction, and combinations and arrangements of parts which will be described in the specification and set forth in the appended claims.

Figure 2:
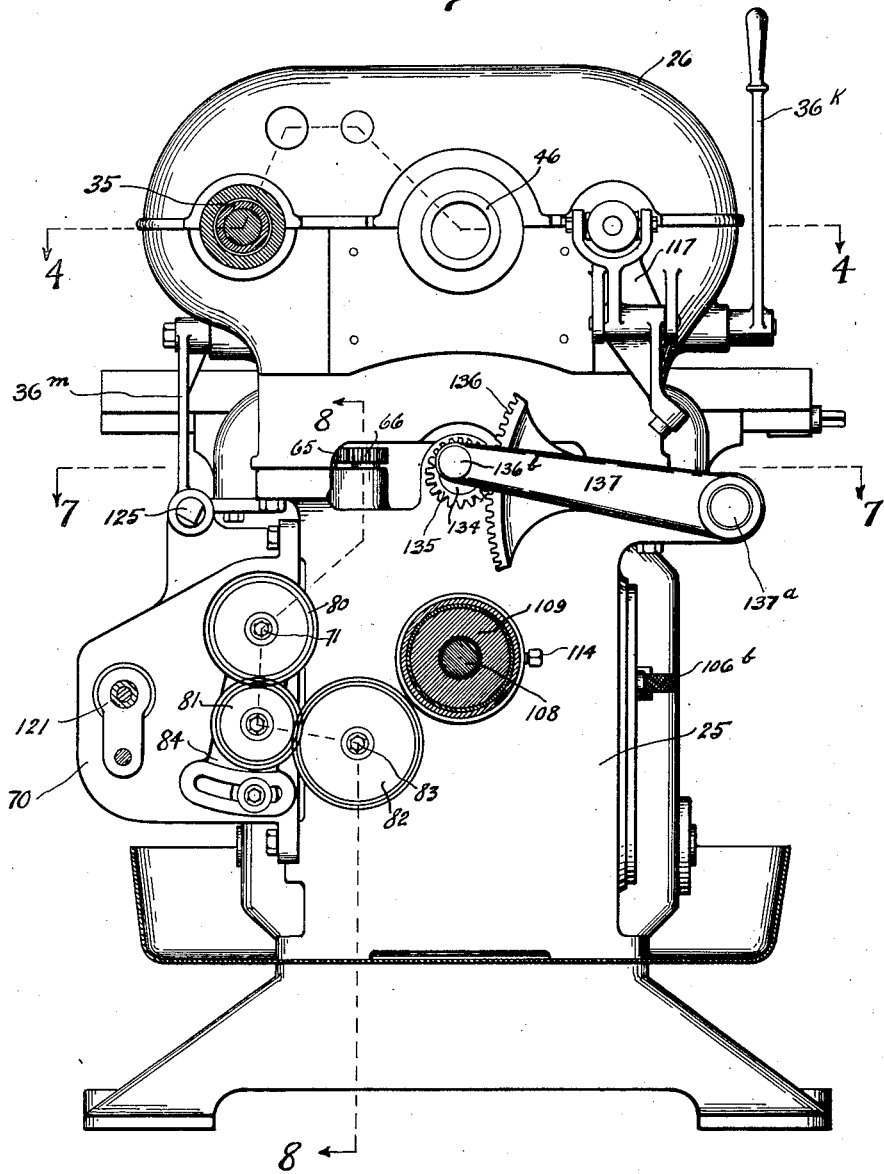
Figure 3:
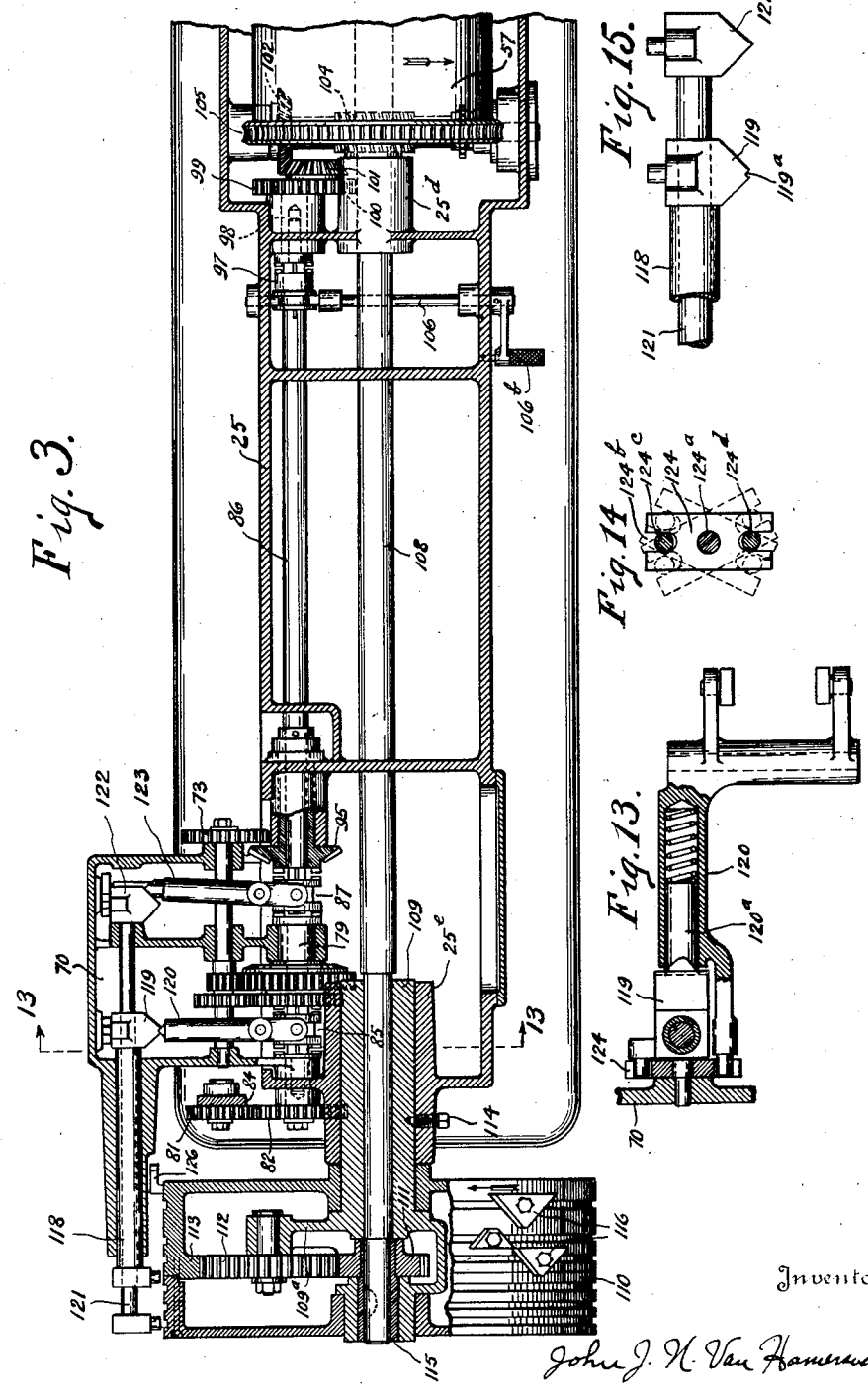
Figure 4:
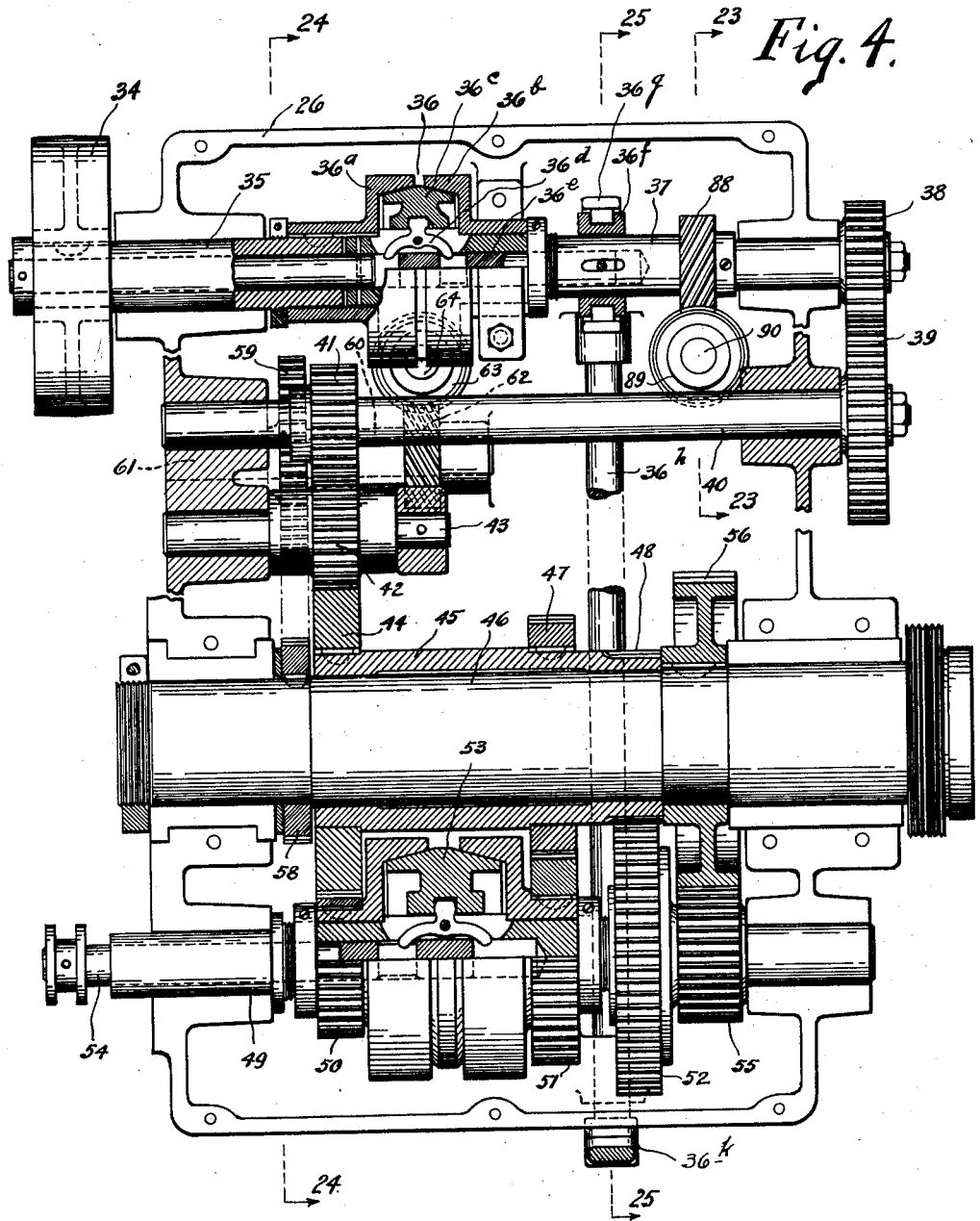
Figure 5:
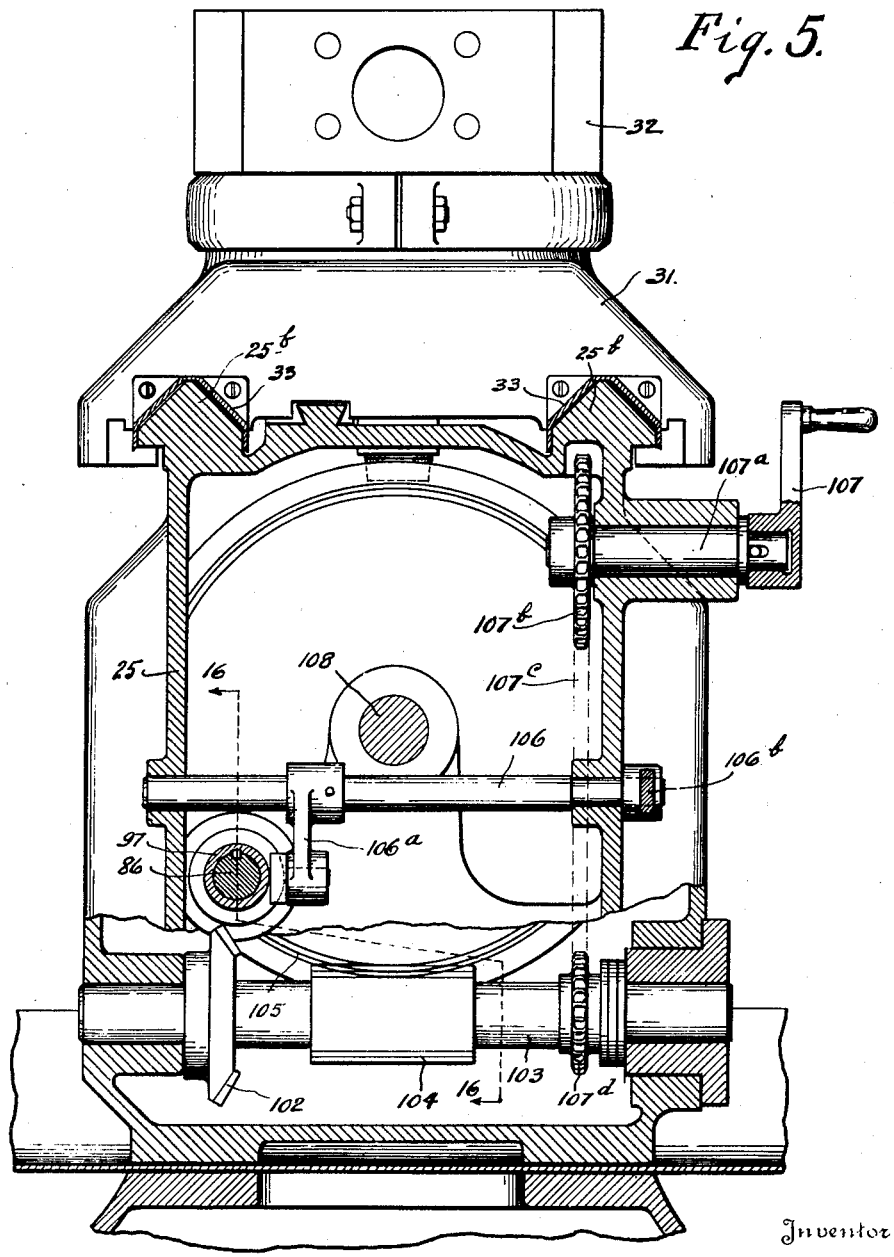
Figure 6:
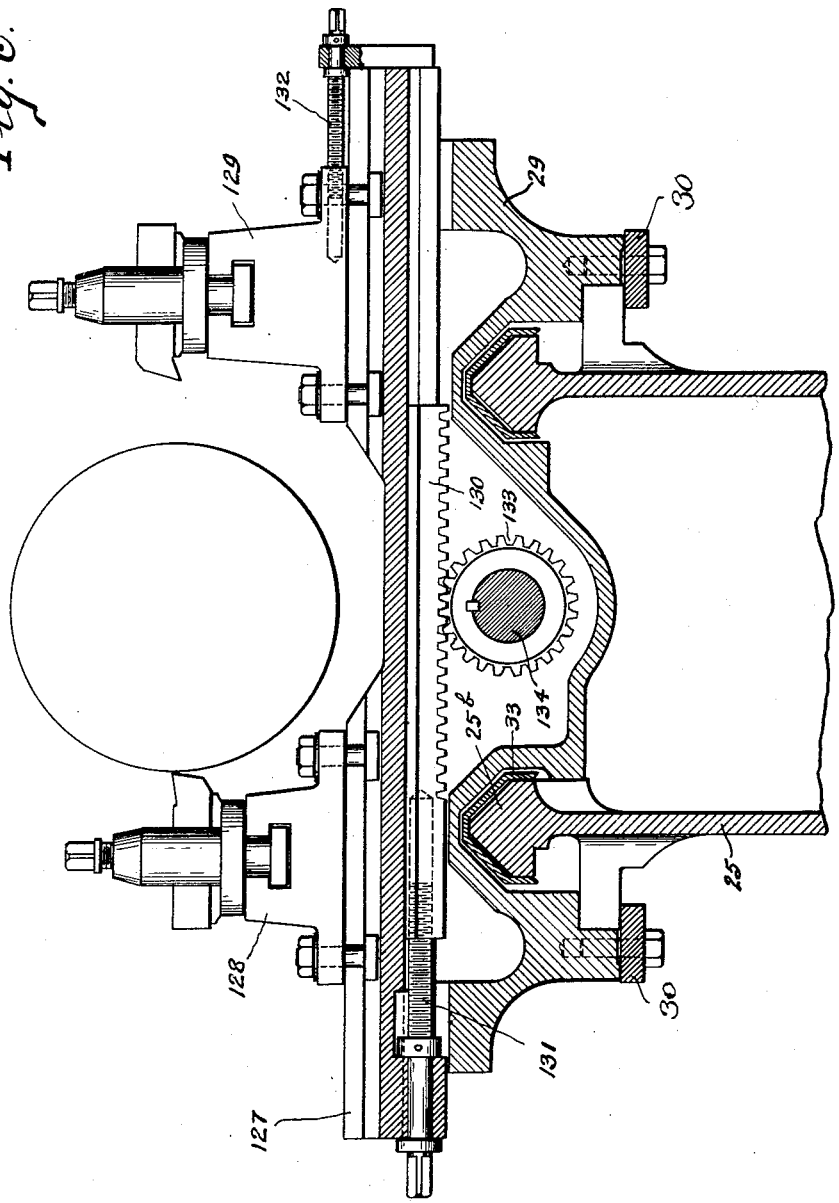
Figure 7:
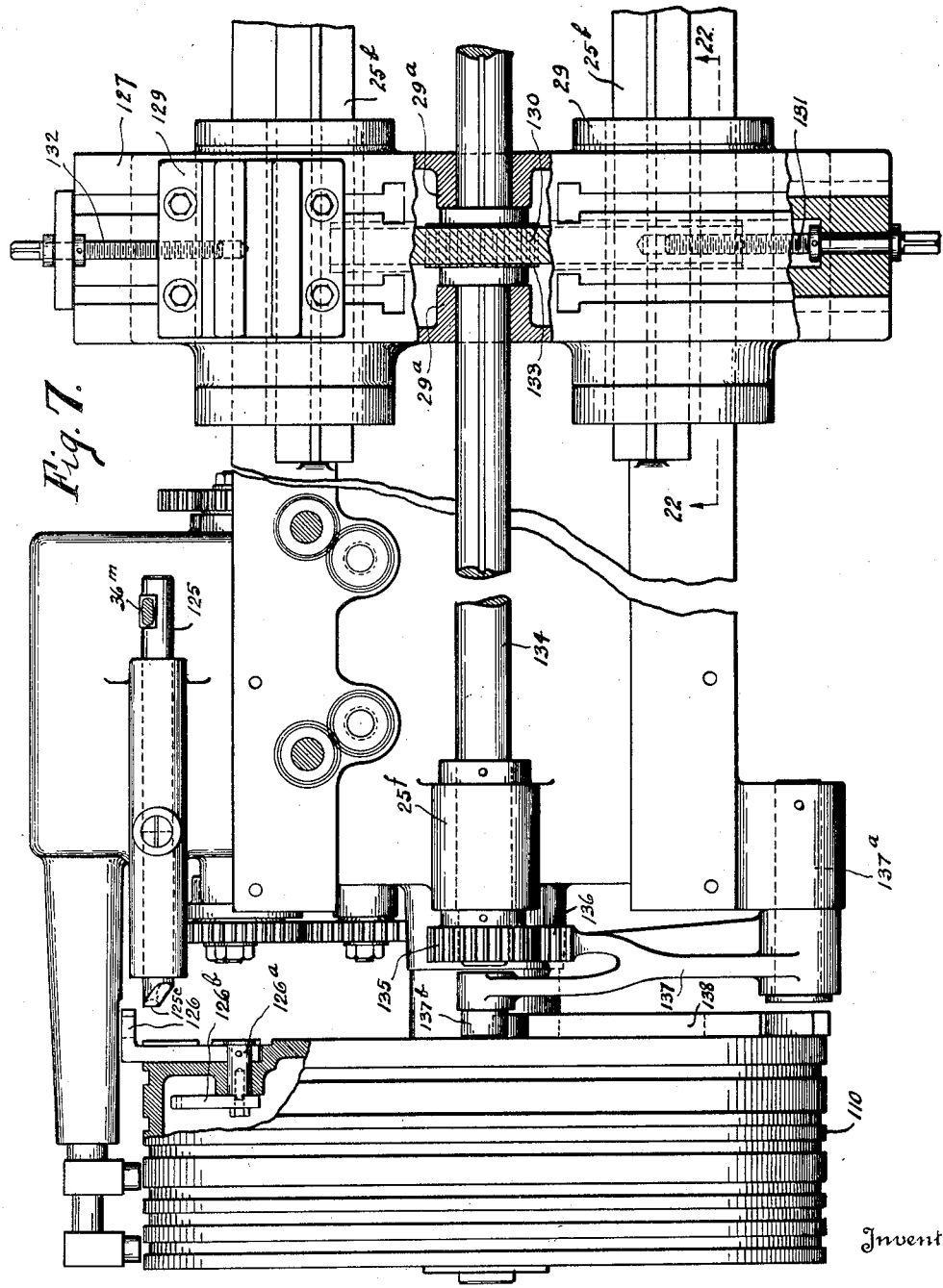
Figure 8:
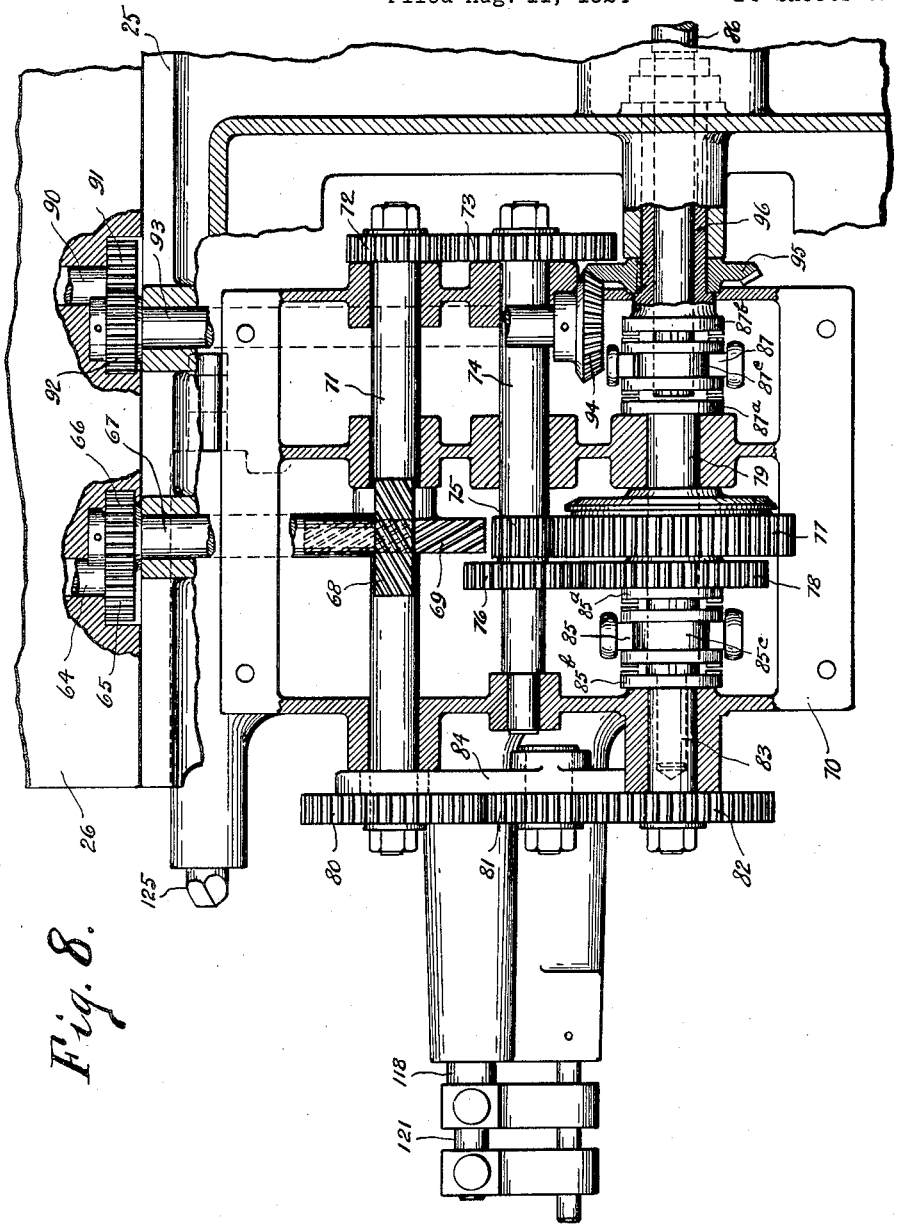

In the accompanying sheets of drawings wherein I have shown the preferred embodiment, which answers the requirements very effectively, Fig. 1 is a side view of the machine; Fig. 2 is an end view with the tappet drum removed and certain parts in section, substantially along the line 2—2 of Fig. 1, looking in the direction indicated by the arrows; Fig. 3 is a sectional plan view with the section taken substantially along the line 3—3 of Fig. 1 looking in the direction indicated by the arrows, and with a portion of the bed at the right hand end of Fig. 1 removed; Fig. 4 is a sectional plan view through the head stock, the section being taken substantially along the irregular line 4—4 of Fig. 2 looking in the direction indicated by the arrows; Fig. 5 is a transverse sectional view substantially along the irregular line 5—5 of Fig. 1, looking in the direction indicated by the arrows; Fig. 6 is a similar transverse sectional view substantially along the line 6—6 of Fig. 1 looking in the direction indicated by the arrows; Fig. 7 is a horizontal sectional plan view of the front half of the machine with the section taken substantially along the line 7—7 of Fig. 2, looking in the direction indicated by the arrows; Fig. 8 is a view looking at the inside of a gear box, the parts being viewed as being in a section along the irregular line 8—8 of Fig. 2, looking in the direction indicated by the arrows, a part of the bed to which the gear box is attached being broken away and removed for the sake of clearness; Fig. 9 is an inside face view of the tappet drum, the section being taken substantially along the line 2—2 of Fig. 1 looking in the opposite direction to that indicated by the arrows on the section line 2—2; Figs. 10 and 11 are detached views of certain parts carried by the tappet drum and of a co-operating part carried by the gear box and utilized in the control of the machine, and particularly for stopping the machine after the cycle of operations is completed; Fig. 12 is a view looking at the head end and rear side of the machine with a portion of the gear box in section; Fig. 13, on sheet 3, is a detail sectional view of certain co-operating parts employed in the automatic speed control, the section being substantially along the line 13—13 of Fig. 3; Fig. 14 is a side view of a swivel plate shown in Fig. 13 with co-operating parts in section; Fig. 15 is a detail view on an enlarged scale showing certain parts of Fig. 3, and particularly two spring point blocks used in the speed control; Fig. 16 (Sheet 14) is a detail sectional view substantially along the irregular line 16—16 of Fig. 5, looking in the direction indicated by the arrows; Fig. 17 is a side view of a portion of the front head or end of the machine showing partly in section and partly in elevation a back facing attachment which may be employed and which is not shown in Fig. 1; Fig. 18 is an end view partly in section of the attachment shown in Fig. 17, looking toward the right of Fig. 17; Fig. 19 is a plan view of a cam shown in Figs. 17 and 18 which can be attached to the outer face of the tappet drum for operating the back facing tool; Fig. 20 is a sectional plan view similar to Fig. 7, and taken substantially along the section line 7—7 of Fig. 2, but illustrating a modification embodying two separately operated cross slides supported on a common cross slide saddle, whereas the construction shown in Fig. 7 has one cross slide with two tool holders mounted thereon which are operated in unison; Fig. 21 is a view similar to Fig. 6, showing the modification of Fig. 20; Fig. 22 is a cross sectional view of the cross slide, the section being taken substantially along the line 22—22 of Fig. 7, looking in the direction indicated by the arrows; Fig. 23 is a sectional view of a portion of the head, the section being taken substantially along the line 23—23 of Fig. 4, looking in the direction indicated by the arrows; Fig. 24 is a similar view substantially along the line 24—24 of Fig. 4, looking in the direction indicated by the arrows, showing a part of the feed train in the head and driven by the work spindle; and Fig. 25 is a view partly in elevation and partly in section, showing the operating lever and certain other parts associated therewith, the parts in section being taken substantially along the line 25—25 of Fig. 4, looking in the direction indicated by the arrows.

Referring now to the drawings, it will be seen that my improved metal working machine includes a bed 25 provided at one end with a head or head stock 26, carrying a rotatable work spindle provided with a chuck 27 in which the work is adapted to be clamped. The head stock is in the form of a unit which is adapted to be secured by bolts 28 to horizontal flanges 25$^a$ projecting laterally outward from opposite sides of the bed. Forwardly of the head stock is a cross slide saddle 29 which is adapted to be adjustably secured by clamps 30 and bolts 30$^a$ to the same flanges 25$^a$ to which the head stock is bolted. This saddle is adapted to be moved along the flanges 25$^a$ and to be secured by the clamps 30 and bolts 30$^a$ in any adjusted position to suit various lengths of work. The manner in which the saddle is secured to these flanges so that the saddle can be adjusted as just stated, is clearly illustrated in Fig. 6. The saddle is provided with a slide which moves crosswise of the bed and is preferably provided with two tool holders movable simultaneously, or the saddle may be provided with two separate cross slides movable independently, and each provided with a tool holder, as will be subsequently explained.

The bed is provided with ways 25$^b$ (see Fig. 5) on which a slide 31 is adapted to travel toward and from the head, said slide being preferably a turret slide carrying a turret 32 adapted to be provided with tools in the customary manner, and to be indexed in any suitable way, but preferably by the indexing mechanism constituting the subject matter of a copending application.

As will be seen particularly by reference to Figs. 1, 5 and 6, the turret saddle 31 is provided with way guards 33 which are secured to the front side of the saddle and cover the ways 25$^b$, so as to protect them from dirt, dust and the like, these way guards projecting through slots or recesses provided on the under side of the cross slide saddle so that the turret slide with its way guards will have free movement and may be brought up sufficiently close to the chuck for all practical purposes.

As will be subsequently explained, the cross slide or slides with the tool holders supported thereon and the turret slide are operated at different feeding speeds in fixed relation to the rotation of the spindle, and also are adapted to be given a constant high speed when the tools are idle, as when returning from or approaching the work piece.

Referring now to the construction of the head 26, it will be seen that at the rear of the head there is a driving pulley 34 which can be driven in any suitable manner, as by a motor mounted on the head, an overhead counter shaft, or otherwise. The pulley 34 is keyed to a hollow shaft 35 which is adapted to be connected by a clutch 36 to a shaft 37 coaxial therewith. The clutch 36 may be of standard construction, and in this instance it is of the friction type, and includes a clutch member 36$^a$, keyed to hollow shaft 35; also a similar but stationary clutch member 36$^b$ for braking purposes, and a movable clutch member 36$^c$ which is slidable on shaft 37 and is adapted to be shifted either into engagement with clutch member 36$^a$ for driving shaft 37, or into engagement with clutch member 36$^b$ to obtain a braking action. Clutch member 36$^c$ is adapted to be shifted by a clutch finger 36$^d$ pinned to an extension of shaft 37 (on which clutch member 36$^c$ is slidably mounted). Clutch finger 36$^d$ is adapted to be rocked by a shifting rod 36$^e$ endwise movable in a bore drilled in shaft 37. Rod 36$^e$ is moved in an endwise direction to actuate the clutch by a shoe ring 36$^f$, which is pinned to the rod and is engaged by a yoke 36$^g$ carried by a rock shaft 36$^h$ extending transversely through the head. This rock shaft is provided at its forward end at the front side of the head with an operating lever 36$^k$ adapted to be manually shifted, thus enabling the operator to start or stop the machine at will. At its rear end this rock shaft 36$^h$ is provided with a lever 36$^m$ located on the rear side of the head, as shown in Figs. 2 and 12, which lever is adapted to be shifted automatically, as will be subsequently explained, to stop the machine at the end of each cycle of operations.

Shaft 37 is provided at its forward end with a pinion 38 engaging a gear 39 on a shaft 40 supported by the head in parallel relation with respect to the aligned shafts 35 and 37. Gears 38 and 39 which are located at the front side of the head are change speed gears which can be replaced with others of a different speed ratio. Shaft 40 carries a pinion 41 engaging an idler pinion 42 on a short shaft 43 supported by the head. This idler engages a gear 44 keyed to a sleeve 45 rotatably mounted on a work spindle 46 carrying the work holding chuck 27 previously referred to. Sleeve 45 is provided in addition to gear 44 with a somewhat smaller gear 47, and a still smaller gear 48, the latter being preferably formed by cutting the teeth directly on the forward end of the sleeve.

Carried by the head alongside the work spindle 46 is a shaft 49, provided with gears 50, 51 and 52, of different sizes, these gears meshing respectively with gears 44, 47 and 48 of the sleeve. Either of the gears 50 and 51 may be clutched to shaft 49 by a clutch 53, which in construction is preferably similar to clutch 36 previously described, the central movable clutch member of this clutch being adapted to be shifted by an endwise movable rod 54 extending into shaft 49, which for a suitable length is hollow. The manner in which this clutch is operated to automatically change the speed of the work spindle and other parts will be described presently.

Gear 52 remains loose on shaft 49 during the period the clutch 53 is engaged, and is adapted to be connected to said shaft by what is commonly termed an automatic overrunning clutch which becomes effective when clutch 53 is in neutral, this gear providing the slowest drive for the work spindle and other parts driven thereby. At its forward end shaft 49 is provided with a pinion 55 meshing with a gear 56 keyed to the work spindle 46. Thus it will be seen that the work spindle is driven from shaft 49, which in turn is driven by a sleeve 45 at three different speeds, being driven at the highest speed by gears 44 and 50, at an intermediate speed by gears 47 and 51, and at the lowest speed by gears 48 and 52.

Referring next to the mechanism for reciprocating the turret slide 31, it will be observed that this slide is reciprocated or moved back and forth by a cam drum 57 (see Fig. 1), rotatably supported in the bed, this cam drum having an endless cam grove 57$^a$ engaging a roller 31$^a$ carried by a part which moves with the turret slide 31.

The cam drum 57 for feeding purposes is driven by the work spindle 46, and for the constant high speed when the slide is receding from or approaching the work it is driven direct from shaft 37, which is a constant speed shaft. The drive for the feeding speeds is as follows:

The work spindle (see Figs. 4 and 23) is provided with a pinion 58 which meshes with a gear 59 on a sleeve 60 rotatably mounted on a stationary shaft 61 carried by the head 26. Sleeve 60 carries a spiral gear 62 which meshes with a spiral gear 63 mounted on a vertical shaft 64 which is carried by and projects through the bottom of the head 26. At its lower end (see Fig. 8) this vertical shaft is provided with a gear 65 meshing with a pinion 66 at the upper end of a vertical shaft 67 carried by the bed 25. At its lower end this shaft 67 is provided with a spiral gear 68 which meshes with a second spiral gear 69, carried by a gear box 70 adapted to be applied as a unit and to be secured to the rear side of the bed. Spiral gear 69 is mounted on a shaft 71, carried by the gear box 70. The forward end of this shaft is connected by change speed gears 72 and 73 to a shaft 74 also carried by the gear box, and provided with two pinions 75 and 76, of different sizes, meshing with gears 77 and 78 on a cluth shaft 79 carried by the gear box. The rear end of shaft 71 is connected by three gears 80, 81 and 82 to a hollow shaft or sleeve 83 which is in axial alignment with shaft 79. Gear 82 is a change speed gear, and gear 81 which is an idler, is carried by a swivel arm 84 (see Fig. 2) so as to permit the ratio of drive between shaft 71 and hollow shaft 83 to be varied at will by changing the size of gear 82. Between gear 78 and hollow shaft 83 is a double acting clutch 85, which includes a clutch member 85$^a$ on one side of a gear 78; also a clutch member 85$^b$ at one end of hollow shaft 83, and also an intermediate shiftable clutch member 85$^c$. The intermediate clutch member 85ᶜ which is adapted to be shifted automatically, as will be later explained, has three positions,—a neutral position, a second position which connects gear 78 to shaft 79, and a third position which connects hollow shaft 83 to shaft 79. Gear 77 is adapted to be connected to shaft 79 by an automatic overrunning clutch which becomes effective when clutch member 85ᶜ is in neutral position. It will be seen, therefore, that shaft 79, which as will be next explained, is utilized in giving feeding speeds to the cam drum 57, is driven from shaft 71 at three different speeds, one speed, which is the highest, being through gears 80, 81 and 82 which become effective for driving when clutch member 85ᶜ is shifted to the left as the same is viewed in Fig. 8; the other two speeds are through change gears 72 and 73, and include an intermediate speed through gears 76 and 78, which are effective when clutch member 85ᶜ is shifted to the right as viewed in Fig. 8, and low speed through gears 75 and 77, which become effective for driving when clutch member 85ᶜ is in neutral position. It might be mentioned that ordinarily the intermediate and low speeds are used for feeding the tool while turning or facing, and that the high speed through gears 80, 81 and 82 may be used for feeding, but generally is used for reaming and thread cutting.

In line with clutch shaft 79 is a shaft 86, supported by the bed 25, this shaft, as shown in Fig. 3, extending back close to the cam drum 57. Between the adjacent ends of clutch shaft 79 and shaft 86 is a clutch 87 having a clutch member 87ᵃ on the forward end of clutch shaft 79, a similar clutch member 87ᵇ adjacent the rear end of shaft 86, and an intermediate clutch member 87ᶜ adapted to be moved into engagement with either clutch member 87ᵃ or clutch member 87ᵇ. When clutch member 87ᶜ engages clutch member 87ᵃ, shaft 86 is driven at a feeding speed. When clutch member 87ᶜ is thrown to the right, as viewed in Fig. 8, so as to engage clutch member 87ᵇ, the feeding speeds are interrupted and the constant high speed is imparted to cam drum 57. This is through a constant high speed drive mechanism which will now be explained.

On shaft 37 on the head 26 there is provided a spiral gear 88, this being the shaft which is driven through clutch 36 by shaft 35 and pulley 34 as already explained. This spiral gear 88 meshes with a spiral gear 89 on a vertical shaft 90, which like shaft 64 extends down through the lower side of the head, as shown in Fig. 8. At its lower end shaft 90 is provided with a pinion 91 engaging a second pinion 92 on a vertical shaft 93, which like vertical shaft 67 is carried by the bed. At its lower end shaft 93 is provided with a bevel pinion 94 engaging a bevel gear 95 on a sleeve or hollow shaft 96 which surrounds the rear end of shaft 86, this sleeve carrying the clutch member 87ᵇ of clutch 87. Inasmuch as the intermediate clutch member 87ᶜ is splined to shaft 86, it will be obvious that when the intermediate clutch member is shifted to the right, as viewed in Fig. 8, sleeve 96 is clutched to shaft 86, and this shaft and the cam drum will be driven at the constant high speed.

Shaft 86, to which the different feeding speeds and the constant high speed are imparted by the mechanisms described above, is provided near its rear end with a clutch 97 by which it may be connected to or disconnected from a short hollow shaft 98 carrying a gear 99 meshing with a similar gear 100 which is on a short shaft supported by the bed and rotates with a bevel pinion 101 meshing with a bevel gear 102 mounted on a horizontal shaft 103 (see Fig. 5) carrying a worm 104, which engages a worm gear 105 which is fixed to and rotates cam drum 57, as shown in Figs. 1 and 3. Thus when clutch 97 is engaged, the rotation of shaft 86 is imparted to cam drum 57, causing the turret slide to be reciprocated at a rate depending upon the speed of rotation of the cam drum.

Clutch 97 is provided to enable the cam drum to be disconnected from the power drive so as to permit it to be turned manually for tool setting purposes, or when trial cuts are to be taken. The clutch 97 may be engaged or disengaged by the operator through the medium of a shaft 106 journaled in the bed and extending crosswise thereof and connected by a clutch shifting arm 106ᵃ to the movable member of clutch 97. The forward end of the shaft which is located at the front side of the bed is provided with a suitable hand lever 106ᵇ which is normally retained in a position such as to engage clutch 97 and which has two positions in which the handle may be locked to the bed, one position being such that the clutch 97 is engaged, and the other with the clutch disengaged.

When the clutch is disengaged, the cam drum can be rotated by a hand crank 107 (see Fig. 5) located also at the front side of the bed at the outer end of a short shaft 107ᵃ which at its inner end is provided with a sprocket wheel 107ᵇ connected by a sprocket chain 107ᶜ to a sprocket wheel 107ᵈ on the worm shaft 103. Hand lever 107 is normally disengaged from shaft 107ᵃ through a suitable spring actuated plunger common in devices of this kind, so as to keep the handle out of driving relation with the shaft during the normal operation of the machine, and it is connected to the shaft so that the drum may be turned by hand when the hand lever is pressed inward.

It is to be noticed that the clutch operating lever 106ᵇ, through which the power drive is established or interrupted, and the lever 107 through which the cam drum may be manually rotated are located at the front side of the bed and forwardly of the cam drum, or near the center of the bed. In other words, they are located at what may be said to be the operator's station or normal position, so that while operating these devices he can view the work and the effect of the tools thereon without changing his position. These operating devices are therefore located not only in a position convenient for the operator, but in a position such that the machine as a whole can be operated in the most efficient manner.

Cam drum 57 is supported on and keyed to a shaft 108 which extends horizontally the full length of the bed, preferably centrally thereof (see Fig. 3). The rear end of the shaft is supported in a bearing carried by the end plate 25$^c$ secured to the end of the bed, as shown in Fig. 1. At the front end of the drum the shaft is rotatably supported in a suitable bearing 25$^d$, forming a part of the bed. This shaft, which is utilized not only to support the cam drum but to drive a tappet drum near the head end of the bed is supported below the head in the bearing 25$^e$, clearly shown in Fig. 3. The bearing 25$^e$ receives the sleeve-like extension of a bracket 109 forming a part of what might be termed the tappet drum unit, of which the tappet drum 110 is a part, this drum being located at the head end of the bed coaxial with shaft 108, as clearly shown in Figs. 1 and 3 and other figures of the drawing. The shaft 108 extends through and has a bearing in the bracket 109, and near its forward end (at the head end of the machine) it is provided with a pinion 111 meshing with an idler gear 112 which is supported on an arm 109$^a$ of the bracket and engages an internal gear 113 of the tappet drum.

The tappet drum unit including the bracket 109, drum 110, gears 111 and 112, as well as the internal gear 113, can be applied to the machine or removed therefrom as a unit, and after being applied by slipping the extended portion of the bracket 109 into bearing 25$^e$ of the bed, and at the same time slipping the extension of the bracket onto shaft 108, it can be secured in place simply by means of a set screw 114 extending through bearing 25$^e$ of the bed into the extension of the bracket, as shown in Fig. 3. In order that pinion 111 may be held in proper relation to gear 112 when the unit is removed from the machine, this pinion is keyed to a sleeve 115 which in turn is splined to the outer end of shaft 108 and has a bearing in the outer portion of the bracket 109.

Thus it will be seen that though the tappet drum is coaxial with shaft 108, and though it is driven by said shaft, it rotates at a different speed than the speed of the latter. The speed ratio between shaft 108 and tappet drum 110 will generally depend upon the number of sides or faces of the turret 32, the drum making one revolution to four revolutions of the shaft when a four-sided turret is used, and making one revolution to six revolutions of the shaft when a six-sided turret is employed, etc. Due to the location of the tappet drum at the head end, said tappet drum can be very large in diameter, resulting in a greater efficiency for the tappets to act on the various clutch shifting levers.

The tappet drum 110 is adapted to be provided with a series of tappets and face cams which control all the automatic functions of the machine including the speed changes for the work spindle effected through the medium of clutch 53, the speed changes of the cam drum including the feeding speeds and the constant high speed, this being effected through clutches 85 and 87, the automatic stopping of the machine which is effected through clutch 36, and in addition the operation of the cross slide or slides through the medium of face cams designed to be applied to the inner face of the cam drum, and finally the operation of the back facing attachment through the medium of a cam or cams applied to the outer face of the cam drum.

The tappets referred to are secured to the periphery of the cam drum, these tappets being designated by the reference character 116 (see Figs. 1 and 12). One series of these tappets operates clutch 53 controlling the work spindle speeds by shifting a lever 117 pivotally supported on the head and suitably connected to the endwise movable clutch shifting rod 54. Another series of these tappets controls the feeding speeds of the cam drum by engaging a roller at the outer end of a sleeve 118, (see Figs. 3 and 12) which sleeve carries a spring point block 119 which shifts a clutch lever 120 controlling clutch 85. Another series of tappets controls the change from feed to the constant high speed, and vice versa, by shifting a roller at the outer end of a rod 121 slidable in the sleeve 118 and provided with a spring point block 122 which shifts a clutch lever 123 which operates clutch 87. The clutch levers 120 and 123, as well as the sliding sleeve 118 and rod 121 are all carried by the gear box 70, and it might be here stated that when the gear box is applied, operative relationship is provided between the parts carried by this gear box and other parts carried by the bed. For example, when the gear box is applied, clutch lever 123 slips into operative relation with the intermediate member of clutch 87, and at the same time spiral gear 69 slips into driving relation with gear 68, which is on shaft 67 carried by the bed (see Figs. 3 and 8). This is a very important advantage from manufacturing and assembling standpoints.

It might be here stated also, that when the head is applied to the bed, driving relation is established between the pinions 65 and 91 on the vertical shafts 64 and 90 carried by the head of the machine with the pinions 66 and 92 on vertical shafts 67 and 93 which are carried by the bed.

I have already explained how the tappet drum unit is applied to the machine and how the driving relation is established between it and shaft 108 when this unit is applied.

Above I stated that the clutch lever 120 is shifted by the spring point block 119 on sleeve 118 operated by one series of tappets, and that clutch lever 123 is shifted by its spring point block 122 on rod 121 shifted by another series of tappets. At this point I wish to explain an important feature that I have provided in connection with these spring point blocks to improve their operation. I associate with each spring point block a swivel plate 124, swiveled by means of a pin 124$^a$ on the back wall of the gear box. This swivel plate has slots 124$^b$ extending inwardly from opposite ends. One of these slots, namely, the upper one, is engaged by a pin 124$^c$ which is carried by the spring point block. The other slot is engaged by a pin 124$^d$ carried by the clutch lever 120 or 123. There is thus provided a positive connection between each spring point block and the clutch lever which it is adapted to shift. It will be observed further, particularly by reference to Figs. 13 and 15, that spring point block 119 is provided at its point with a notch 119$^a$ with which the spring point 120$^a$ of clutch lever 120 is adapted to engage when clutch 85 is in its neutral position. The action of the swivel plate is as follows, reference being had first to the spring point block 119: Assuming, for example, that spring point block 119 is at its innermost or right hand position, then the intermediate clutch member of clutch 85 will be in engagement with the right hand clutch member, as viewed in Fig. 3. Now, as the sleeve 118 is moved to the left, the swivel plate 124 associated therewith, is rocked by the movement of the spring point block 119 in such a member that the lower part of the swivel plate positively moves the clutch lever to its middle position, thus causing the clutch to be disengaged positively instead of by the action of the spring behind the spring point. When the clutch lever reaches its middle position, the end of the spring point 120$^a$ engages in a notch 119$^a$ of the spring point block 119, and the lever is held in its middle or neutral position by the notch. Further movement of sleeve 118 toward the left moves the spring point block toward the left and positively moves the upper end of the lever as the same is viewed in Fig. 3, and the spring point to the right until the latter is free of notch 119$^a$, at which time the spring behind the spring point becomes effective to cause the clutch member to engage the clutch member on the opposite side to that which it previously engaged.

The action of the swivel plate associated with spring point block 122 on clutch lever 123 is precisely the same as that above described, except that spring point block 122 does not have a notch corresponding to the notch 119$^a$, since clutch 87 is not intended to be held in neutral position. In other words, when either spring point block is moved in either direction by the tappets on the tappet drum, the clutch is positively disengaged by the action of the swivel plate on the associated clutch lever, and when the clutch lever is moved past neutral position the spring associated with the spring point of the lever throws the clutch into engagement with the clutch member on the opposite side. The disengagement of the clutch members positively instead of by means of a spring which has always been the case heretofore in constructions employing a spring point and spring point block feature, I regard as an important improvement as it renders the clutches more reliable than heretofore.

The main clutch 36 in the head is automatically disengaged at the completion of the cycle of operations by the following means: It will be observed by reference to Fig. 12, that the clutch lever or arm 36$^m$ at the rear side of the head is engaged in a notch of an endwise movable rod 125 which is slidingly mounted in the upper part of the gear box 70. As will be observed from Fig. 12, rod 125 is provided between its ends with a notch adapted to be engaged by a spring point 125$^a$ pressed upward by a spring 125$^b$, this notch being so positioned that it is engaged by the spring point when the main clutch 36 of the head is in neutral position. The rear end of rod 125 is beveled as shown at 125$^c$. As shown in Fig. 12, the parts are in position corresponding to neutral position of clutch 36, and when this clutch is manually engaged by the operator shifting hand lever 36$^k$, lever 36$^m$ is swung to the right as the same is viewed in Fig. 12 and rod 125 is moved toward the right or toward the tappet drum, causing the notch in rod 125 to ride past the spring point 125$^a$. It will be obvious that if the rod 125$^a$ is moved by a part carried by the tappet drum toward the left, the clutch 36 will be disengaged. This is accomplished by providing on the cam drum a cam lever 126, shown in Figs. 7, 9, 10, 11 and 12. This cam lever is secured to a swivel pin 126$^a$ extending through the front side of the tappet drum, and its inner end on the interior of the drum is provided with a lever 126$^b$ to which is connected a spring 126$^c$, one end of which is stationarily held and is fastened to the inner side of the drum in the manner illustrated in Fig. 9.

The parts are so arranged that as the cam lever comes around into engagement with the beveled end 125ᶜ of rod 125 the engagement of these parts first causes the cam lever to be shifted from its normal position, shown in Figs. 9 and 11 to the position shown in Fig. 10. When the lever is thus moved against the shoulder of the cam drum designated 126ᵈ (see Fig. 10), the rod 125 is cammed outwardly, resulting in the disengagement of clutch 36. This brings spring point 125ᵃ into registration with the beveled side of notch of rod 125 and the action of the spring point is such as to move rod 125 further in the same direction than it was moved by the cam lever 126, this movement being sufficient to cause the beveled end 125ᶜ of rod 125 to clear the cam lever, thus permitting the spring 126ᶜ to move the cam lever back to its normal position shown in Figs. 9 and 11, so that it will be past rod 125, allowing the subsequent manual re-engagement of clutch 36. It will be understood that as soon as the clutch 36 is disengaged, the tappet drum comes to a stop, and if it were not for the improved mechanism herein provided, including the spring point 125ᵃ and the swiveling action of the cam lever 126 with the spring 126ᶜ, the parts would come to a stop with cam lever 126 partly engaged with the beveled end of rod 125 which would prevent the subsequent re-engagement of clutch 36. However, the mechanism which I have provided automatically moves the rod 125 completely out of the path of the point of cam lever 126, permitting it to swing past the point of rod 125, or to move out of alignment with it, allowing the re-engagement of clutch 36.

I will next describe the cross slide and the manner in which it is actuated by the tappet drum. In the preferred construction the cross slide saddle 29 is provided with a cross slide 127 carrying two tool holders 128 and 129 which are on opposite sides of the work piece when the machine is in operation. On the lower side of cross slide 127 is a rack 130, which is slidably supported on the lower side of the cross slide so that by means of an adjusting screw 131 the relative position of the rack and slide can be adjusted to accurately position the front tool holder with reference to the work piece. By a similar adjusting screw 132 on the cross slide, the rear tool holder 129 may be adjusted on the cross slide to accurately position it with respect to the work piece.

The rack 130 is engaged by a pinion 133 on a shaft 134, which shaft is preferably centrally arranged with respect to the ways of the machine and is located above drum shaft 108 (see Fig. 2). This shaft is supported near the head end of the machine in a bearing 25ᶠ of the bed (see Fig. 7). The rear end of the shaft is journaled in bearings 29ᵃ of the cross slide saddle. At the end of shaft 134 located at the head of the machine, is a pinion 135 (see particularly Figs. 2 and 7), which is adapted to be engaged and rotated by a gear segment 136 carried by and forming a part of a lever 137 mounted on a bearing pin 137ᵃ supported by the bed, as best shown in Figs. 2 and 7. Lever 137 carries a roller 137ᵇ which is adapted to be engaged by two pairs of face cams 138 and 138ᵃ which are secured to the inner face of the tappet drum. In Fig. 9 which shows these face cams, lever 137 is shown in neutral position, and when it is in this position the tools carried by the front end rear tool holders 128 and 129 are both clear of the work piece. Assuming that the drum is rotating in the direction indicated by the arrow, the action of the face cams 138 is first to move the front tool holder inward into engagement with the work piece, and then to retract the front tool from the work piece bringing the lever again to neutral position. Further rotation of the cam drum brings the face cams 138ᵃ into action, and the function of these face cams is to first bring the rear tool forward into engagement with the work piece and then to retract the slide, bringing the lever again to neutral position.

It will be understood that the action of these face cams on the roller 137ᵇ and lever 137 is to rock lever 137 and the gear segment 136 rotating the shaft 134, causing the pinion 133 to rotate first in one and then in the opposite direction, and to move the rack 130, and therefore the cross slide, first in one direction and then the other.

Inasmuch as the tappet drum which actuates the cross slide is connected to and driven by the cam drum 57, obviously the tappet drum and cam drum are driven in fixed relation to one another, and both will be subjected to the different speed changes for the cam drum 57, but the actual speed imparted by the tappet drum to the cross slide will, of course, depend not only upon the speed of the tappet drum but also the angularity of the face cams.

I mentioned in the early part of the description that the cross slide saddle may be provided with a single reciprocating slide carrying two tool holders, and the construction embodying that feature has been described above. I also mentioned that the cross slide saddle may be provided with two separately or independently movable cross slides so as to enable the tool holders carried by them to be moved toward and from the work piece independently of each other. The latter construction is illustrated in Fig. 20 and Fig. 21. By referring to these figures it will be observed that the cross slide saddle 29 is provided with two independent cross slides 127ᵃ which respectively support the tool holders 128ᵃ and 129ᵃ, arranged on opposite sides of the work piece. These slides carry two racks 130ᵃ, with respect to which the cross slides 127ᵃ may be adjusted by means of adjusting screws 131ᵃ. The racks 130ᵃ of the cross slides 127ᵃ are engaged by two pinions 133ᵃ, one splined to shaft 134, which is the same as in the construction first described, and the other being keyed to one part 139 of a two-part telescopic sleeve, the other part being designated 139ª. This two-part sleeve surrounds shaft 134, the part 139ª which is toward the head end of the machine being fixed as far as endwise movement is concerned, and the other part 139 being slidable along shaft 134 when the cross slide saddle is adjusted along the bed. The forward or head end of shaft 134 is provided with a pinion 135 similar to that first described, and the corresponding end of sleeve member 139ª is provided with a similar pinion 135ª. Pinion 135 is rotated by a lever 137 carrying a gear segment 136 which meshes with the pinion, while the other lever 137ᶜ in a similar manner rotates pinion 135ª by a gear segment 136ª which is part of the lever 137ᶜ. Both these levers 137 and 137ᶜ are rocked by face cams on the inner face or end of tappet drum 110, as in the construction first described, but in this instance the cross slides are moved independently toward and from the work piece instead of simultaneously as in the construction first described.

There is still one additional function performed by the tappet drum, not yet described, that being the operation of the back facing attachment if the same is employed on the machine. In the main figures of the drawing I have omitted the back facing attachment, but the same is illustrated in Figs. 17, 18 and 19. By referring to these figures, it will be observed that the back facing attachment includes a bracket 140 having portions 140ª designed to be bolted to the rear end of head 26, and a portion 140ᵇ designed to be bolted to the outer end of bracket 109 of the tappet drum unit. By thus attaching the bracket to the head and to the rearwardly extended portion of bracket 109, bracket 140 is very effectively supported when it is applied to the machine. The attachment further comprises a back facing bar or tool holder 141, which is adapted to be extended into the work spindle which is hollow, as is usually the case. This bar 141 is adapted in any suitable manner to receive and hold the back facing tool, as by means of a taper socket 141ª. The outer portion of the bar 141 carries a clutch member 142 which is adjustably mounted on and keyed to said bar. This clutch member is adapted to engage a cooperating clutch member 142ª which is stationarily mounted in a boss of a slide 143 carried by a horizontal portion 140ᶜ of the bracket 140. The clutch member 142ª is formed as a part of a sleeve carried by the slide, and the bar has a bearing in this sleeve, being capable of rotating therein as well as moving in an endwise direction. When the clutch, composed of the two parts 142 and 142ª, is disengaged, the bar is idle and may rotate freely with the work spindle, there being, however, no driving relation between the bar and the work spindle. When, however, the clutch is engaged, the bar is prevented from rotating. Adjustably mounted on bar 141 rearwardly of slide 143 is an adjustable collar 144 which has a threaded engagement with the bar 141. Between this collar and clutch member 142 the boss of slide 143 and clutch member 142ª have a predetermined movement, the movement in the forward direction serving first to engage the clutch to prevent rotation of the bar and then to move the bar forwardly to bring the tool into engagement with the work piece. The rearward movement of the slide first causes the disengagement of the clutch and then when the boss of the slide engages collar 144, the bar is retracted, moving the tool away from the work piece.

The slide 143 is moved inwardly so as to engage the clutch, and then move the bar 141 forwardly, as explained above, by a cam 145 secured to the outer face of the tappet drum 110, this cam being shown in Figs. 17, 18 and 19. The working face of the cam is designed to engage a roller 143ª mounted on the lower side of slide 143.

The slide is moved outwardly so as to first disengage the clutch, and then retract bar 141 as explained above, by means of a spring 146, this spring being housed in the bracket 140 and engaging the lower part of the slide, as clearly shown in Fig. 17. The spring thus moves the slide rearwardly when the cam 145 is moved past roller 143ª, and this rearward or out movement continues until the rear side of the slide engages an abutment 140ᵈ of bracket 140.

Cam 145 is so designed that any suitable feed can be given to bar 141 with its tool, and generally this cam is so designed that a relatively quick return motion is given to the bar and tool when retracted from the work piece.

It will be seen from the above description that the tappet drum carries the tappets and other cam members which control all the automatic functions of the machine including the change in work spindle speed, the change of feed of the various tool slides, the conversion of feed movement to constant high speed movement and vice versa, the operation of the cross slide or slides as well as the control of the rate of the movements imparted thereto, the operation of the back facing attachment, and the operation of the clutch which stops the machine when the cycle of operations is completed. The controlling tappets and other cam members are thus carried by a single element which is accessible from all sides, permitting all tappets and cam members to be adjusted to obtain the best results and the highest efficiency. This is a distinct advantage over prior machines of which I am aware, due to the fact that all tappets and cam members are localized on one member, in this instance the tappet drum, and due to the further fact that all parts of said drum are accessible.

It might be here stated in conclusion, that it is possible with the construction which I have described above, to remove the tappet drum unit without disturbing the positions of any of the cam members or tappets thereon, and then to substitute another tappet drum unit when a different set-up is desired. Of course the machine is not necessarily employed in this manner, for it is always possible to constantly employ the same tappet drum and to adapt the machine for different set-ups by substituting new tappets or other cam members, or by re-arranging or adjusting their positions.

It will be seen from the above that I have provided a machine which answers the requirements and attains the objects stated at the beginning of the specification. Though I have shown the preferred construction and one modification in so far as the cross slide saddle and cross slides are concerned, I do not desire to be confined to the details of construction or arrangement illustrated, but aim in my claims to cover all modifications which do not involve a departure from the spirit and scope of the invention as set forth in the appended claims.

Having described my invention, I claim:

1. In a metal working machine, a bed having a head and a slide, a cam drum for operating the slide, a shaft supporting said drum, mechanism between the head and the drum for rotating the drum at different speeds, clutching means controlling said mechanism, means comprising a tappet drum mounted coaxially with said shaft for operating the clutching means, and means by which the tappet drum is driven by said shaft but at a different speed than the latter is driven.

2. In a metal working machine, a bed having a head and a slide, a cam drum for operating the slide, a shaft on which said drum is mounted, mechanism between the head and drum for rotating the latter at different speeds, clutching means for controlling said mechanism, means comprising a tappet drum for operating the clutching means, said drum being mounted coaxially with said shaft, and a drive between said shaft and the interior of the tappet drum.

3. In a metal working machine, a head and a slide adapted to be operated at different speeds, a tappet drum, a shaft arranged coaxially with the tappet drum for rotating it, and driving means between said shaft and the interior of the drum whereby the periphery and both faces of the drum may be provided with cam members.

4. In a metal working machine, a head, slides adapted to be operated at different speeds, a shaft, and two cam drums arranged coaxially of said shaft and one rotating with the shaft and means whereby the other is driven by the shaft but at a different speed than the shaft is driven.

5. In a metal working machine, a bed having a head and one or more slides adapted to be operated at variable speeds, a pair of cam drums, and a shaft extending lengthwise of the bed coaxially of said drums, the shaft being rotated by one drum and in turn rotating the other drum at a different speed than the first-named drum is rotated.

6. In a metal working machine, a bed having a head and a slide adapted to be operated at different speeds, a shaft, a tappet drum unit adapted to be applied to or removed from the machine as a unit and comprising a tappet drum, and driving mechanism adapted to connect the drum to said shaft.

7. In a metal working machine, a head, a slide adapted to be operated at a plurality of speeds, a shaft, and a tappet drum unit comprising a tappet drum and a supporting bracket therefor adapted to be applied to or removed from the machine as a unit, said bracket supporting the unit when applied to the machine with the drum coaxial with the shaft.

8. In a metal working machine, a bed having a head, a slide adapted to be operated at different speeds, a shaft, and a cam drum unit comprising a drum, a supporting bracket, and gearing for transmitting motion between the shaft and drum, said bracket supporting the drum coaxially with the shaft when the unit is applied to the machine.

9. In a metal working machine, a bed having a head, a slide adapted to be operated at different speeds, a shaft, a tappet drum unit including a drum with an internal gear, a bracket, and driving gears for transmitting motion between the drum and shaft, said drum and gears being supported by said bracket with the drum in coaxial relation with said shaft.

10. In a metal working machine, a bed having a head and provided with ways, a saddle slidably mounted on the ways and provided with a cross slide, and means for reciprocating said cross slide comprising a shaft in the bed centrally between the ways and extending lengthwise thereof and operatively connected with the cross slide, and a tappet drum having means for rotating said shaft in opposite directions, said shaft being near the top of the bed above the axis of the tappet drum.

11. In a metal working machine, a bed having a head and provided with ways, a saddle slidably mounted on the ways and provided with a cross slide, and means for reciprocating the cross slide comprising a shaft located in the bed and extending lengthwise thereof, a rack and pinion connection between the shaft and the cross slide, a rotatable drum at the head end of the bed, a cam on the drum for rotating said shaft, and means located on the inner side of the drum for transmitting motion from the cam to the shaft.

12. In a metal working machine, a bed having ways, a saddle mounted on the ways and provided with a cross slide, a shaft for reciprocating the cross slide, said shaft extending through the bed lengthwise thereof and operatively connected with the cross slide, a rotatable drum at the head end of the bed for rotating the shaft and provided with cam members, and means comprising a lever located on the inner side of the drum and operatively connected to said shaft and adapted to be rocked by said cam members.

13. In a metal working machine, a bed having a head and provided with ways, a saddle slidably mounted on the ways and provided with a cross slide, means for reciprocating said slide comprising a shaft extending lengthwise through the bed, a rack and pinion connection between the shaft and cross slide, a rotatable cam drum at the head end of the bed and having cam members, a lever supported by the bed at the inner side of the drum so that it may be rocked by said members, and an operative connection between the lever and said shaft.

14. In a metal working machine, a bed having a head and provided with ways, a cross slide saddle adjustable along the ways and carrying a cross slide, means for reciprocating the cross slide comprising a shaft extending longitudinally through the bed, a pinion rotatable with the shaft and movable with the slide when the saddle is adjusted along the bed, a rack carried by the cross slide and engaging said pinion, a rotatable cam drum at the head end of the bed, and means located at the inner side of the drum by which said cam drum causes rocking movements to be imparted to said shaft.

15. In a metal working machine, a bed having a head, a cross slide saddle adjustable lengthwise thereof and provided with a cross slide, means for reciprocating the cross slide comprising a shaft extending lengthwise of the bed between the front and rear sides thereof and having two pinions, one fixed to the end thereof and the other adapted to be rotated by the shaft, a rack carried by the cross slide and engaging said second-named pinion, a rotatable cam drum at the head end of the bed, and means located at the inner side of the drum by which said cam drum rotates said fixed pinion in opposite directions.

16. In a metal working machine, a bed having a head, a cross slide saddle adjustable along the bed, a cross slide carried by the saddle, a shaft extending lengthwise of the bed between the sides thereof, a rack carried by the slide, a pinion engaging the rack and movable with the slide and rack when the saddle is adjusted along the bed, a cam drum for rotating the shaft, and means for adjusting the slide relative to the rack.

17. In a metal working machine, a bed, a head having a rotatable spindle with front and rear bearings, a slide, and two driving trains between the head and the slide for actuating the same at different speeds, said trains including co-operating parts located between the spindle bearings and carried partly by the bed and partly by the head, and said head being in the form of a unit which when applied to the bed brings said parts in co-operative relation.

18. In a metal working machine, a bed, a head having a rotatable spindle with front and rear bearings, a slide movable along the bed, and two driving trains between the head and the bed for operating the slide at different speeds, said trains including gears carried by the head between the spindle bearings and gears carried by the bed, and said head being in the form of a unit which when applied to the bed causes said gears carried by it to move into driving relation with said gears carried by the bed.

19. In a metal working machine, a bed having a head provided with a rotatable spindle, a slide movable along the bed, mechanism between the head and the slide for operating the latter and including a vertical shaft carried by the head and provided with a gear, and a shaft carried by the bed and provided with a gear, said head being in the form of a unit which when applied brings said gears in driving relation.

20. In a metal working machine, a bed having a head provided with a rotatable spindle, a slide movable along the bed, mechanism between the head and the slide for operating the latter and including a shaft carried by the head and provided with a gear, and a vertical shaft carried by the bed and provided with a gear, said head being in the form of a unit which when applied to the bed brings said gears into driving relation.

21. In a machine tool, a bed having a head provided with a rotatable spindle, a slide movable along the bed, and mechanism between the head and the slide for operating the latter, and including two shafts carried by the head and provided with gears and two shafts carried by the bed and provided with gears, said head being in the form of a unit which when applied to the bed brings said gears carried by the head into driving relation with said gears carried by the bed.

22. In a metal working machine, a bed having a head provided with a rotatable spindle, a slide movable along the bed, and mechanism between the head and the slide for operating the latter and including two vertical shafts carried by the head and each provided at its lower end with a gear and two vertical shafts carried by the bed and each provided at its upper end with a gear, said head being in the form of a unit which when applied to the bed brings said gears carried by it into driving relation with said gears carried by the bed.

23. In a metal working machine, a bed having a head provided with a plurality of spindles including a work spindle, a slide movable along the bed, and mechanism between the head and the slide for operating the latter and including two shafts geared to the two separate spindles of the head and carrying driving gears and including also two shafts carried by the bed and provided with gears adapted to be driven by the first-named gears, said head being in the form of a unit which when applied to the bed brings said gears carried by it into driving relation with said gears carried by the bed.

24. In a metal working machine, a bed provided with a head having a rotatable spindle, a slide movable along the bed, multiple speed operating mechanism between the head and the slide, and a gear box adapted to be applied to the bed, part of said mechanism being carried by the gear box and part carried by the bed, and said mechanism including also a clutch including a clutch member carried by the bed and a clutch lever carried by the gear box, said lever coming into operative relation with said clutch member when the gear box is applied to the bed.

25. In a metal working machine, a bed having a head provided with a rotatable spindle, a slide movable along the bed, and mechanism between the head and the slide for operating the latter at different speeds, said mechanism being carried in part by the head and in part by the bed and including a gear box having a gear adapted to mesh with a gear carried by the bed and including also a clutch having one element carried by the bed and another element carried by the gear box, said gears and said clutch elements being brought into co-operative relationship when the gear box is applied to the bed.

26. In a metal working machine, a bed having a head provided with a rotatable spindle, a slide movable along the bed, and mechanism between the head and the slide for giving the slide different feeding speeds, and a faster speed, said mechanism including a shaft carried by the bed, and two driving trains, one including a gear box having gears for said shaft and the other train including shafts and gears carried by the head and bed independently of the gear box.

27. In a metal working machine, a bed having a head provided with a rotatable spindle, a slide movable along the bed, mechanism for driving the spindle and for operating the slide at different speeds, a clutch for controlling the speed of one of said parts, and mechanism for controlling the clutch automatically comprising co-operating devices for causing the clutch to be positively disengaged and to be engaged through yielding means.

28. In a metal working machine, a bed having a head with a rotatable spindle, a slide movable along the bed, mechanism for operating one of said parts at a plurality of speeds, a double acting clutch comprising an intermediate clutch member movable between two co-operating clutch members, and automatic means for controlling said clutch and including co-operating parts by which the intermediate clutch member is moved positively from engagement with one of the co-operating clutch members and is moved into engagement with the other of the co-operating clutch members through yieldable means.

29. In a metal working machine, a bed having a head with a rotatable spindle, a slide movable along the bed, mechanism for operating the slide at different speeds including a clutch having a movable member and a lever for operating it, mechanism for automatically operating the lever comprising a spring point carried by the lever and a movable spring point block co-operating therewith, and means between the spring point block and the lever for causing the clutch to be disengaged positively.

30. In a metal working machine, a bed having a head with a rotatable spindle, a slide movable along the bed, mechanism for operating the slide at different speeds including a clutch having a movable member and a lever for operating it, mechanism for automatically operating the lever comprising a spring point carried by the lever, and a movable spring point block co-operating therewith, and means between the spring point block and the lever for causing the clutch to be disengaged positively and to be reengaged by spring pressure acting on the spring point.

31. In a metal working machine, a head having a rotatable spindle, a slide movable along the bed, mechanism for operating the slide at different speeds and including a clutch having a clutch lever with a spring point, and means for automatically operating said clutch comprising a movable member having a spring point block co-operating with said spring point and having a portion adapted to be engaged by the spring point to hold the clutch in neutral position.

32. In a metal working machine, a bed having a head, a slide movable along the bed, means for operating the slide at different speeds, said means including shafts and a plurality of gear trains, a pair of clutches for controlling the gear trains, and means for automatically operating the clutches comprising a tappet drum and a plurality of coaxial endwise movable members adapted to be shifted by tappets on the drum and operably connected with the clutches and spring point means between said members and the clutches.

33. In a metal working machine, a bed having a head with a rotatable spindle, a slide movable along the bed, means for operating the slide at different speeds comprising a plurality of shafts and gear trains, clutches for controlling the same, means for operating the clutches comprising a tappet drum having tappets, a pair of coaxial endwise movable members adapted to be shifted by the tappets, and spring point means between said members and the clutches.

34. In a metal working machine, a bed having a head, a slide movable along the bed, means for operating the slide at a plurality of speeds, said means comprising a plurality of shafts and gear trains, a pair of coaxially arranged clutches for controlling the same, means for automatically operating the clutches comprising a tappet drum having tappets, and two coaxial endwise movable members adapted to be shifted by the tappets and operatively connected with the clutches.

35. In a metal working machine, a bed having a head with a rotatable spindle, a slide movable along the bed, means comprising a shaft extending along the bed for operating the slide, means for rotating said shaft at different speeds comprising two shaft members coaxially arranged with respect to each other and with the first-named shaft, and a pair of coaxially arranged clutches by which the said shaft members may be coupled or uncoupled or connected to said first-named shaft.

36. In a metal working machine, a bed having a head with a rotatable spindle, a slide movable along the bed, means for imparting different feeding speeds and a constant high speed to the slide comprising a shaft, a plurality of gear trains connected to the spindle, a gear train independent of the spindle, two shaft members in coaxial arrangement with said shaft, and two coaxial clutches by which said shaft members may be coupled to each other or to said shaft to render the different gear trains effective and ineffective.

37. In a metal working machine, a bed having a rotatable member, a slide, mechanism for rotating said rotatable member and for operating the slide, means for automatically stopping the machine including a clutch having an operating member, a cam carrying member for shifting said operating member, to disengage the clutch, and means for causing a further movement of the operating member independently of the cam carrying member.

38. In a metal working machine, a rotary member, a slide, mechanism for rotating said member and for operating the slide, means for automatically stopping the machine comprising a clutch, a clutch operating member, a rotatable cam member having a cam for shifting said operating member to disengage the clutch, and means for causing the cam to move past the operating member after the clutch is disengaged to permit the subsequent reengagement of the clutch.

39. In a metal working machine having a clutch for stopping the same, means for automatically disengaging the clutch comprising an operating member connected to the clutch, a rotatable member having a cam adapted to engage and shift the operating member, means for moving the operating member away from the cam so that the cam will clear it, and means for moving the cam past the end of the operating member after the clutch is disengaged to permit the subsequent reengagement of the clutch.

40. In a metal working machine, tool and work holding members, a cam drum for operating one of said members, and mechanism for controlling said members, said mechanism including a drum having cams carried by its periphery and both faces, and mechanism for rotating said drums in predetermined relation.

41. In a metal working machine, tool and work holding members, a cam drum for operating one of said members, and mechanism for controlling said members, said mechanism including a drum, having feed and speed changing cam members on its periphery and cam members applied to both its faces for operating certain of said members, and means for rotating the two drums in predetermined relation.

42. The combination with a bed having a head stock with a hollow work spindle, a tool slide, mechanism for controlling or operating the slide including a tappet drum, a bracket for supporting the same, and a back facing tool having a supporting attachment to said bracket.

43. The combination with a bed having a head stock with a hollow work spindle, a tool slide, mechanism for controlling or operating the slide including a tappet drum, a bracket for supporting the same, a back facing tool extending into the hollow spindle, and a support for said tool attached both to the head stock and to said bracket.

44. The combination with a bed having a head stock with a hollow work spindle, a tool slide, mechanism for controlling or operating the slide including a tappet drum, a bracket for supporting the same, and a back facing tool having a supporting attachment to said bracket, said drum being provided with a cam for operating the back facing tool.

45. In a machine tool, a bed having a head provided with a spindle, a slide on the bed, a main driving member carried by the head and geared to the spindle, slide operating mechanism including two driving trains, one connected to the spindle for imparting feeding speeds, and the other connected to said main driving element for imparting high speed movements to the slide, a clutch for disconnecting the operating mechanism including both trains from the slide, and devices located at the front side of the bed for operating the clutch and for manually shifting the slide when the clutch is disengaged.

46. In a machine tool, a bed having a head provided with a spindle, a slide mounted on the bed, a drum for reciprocating the slide, a main driving element carried by the head and geared to the spindle, means for rotating the drum including two trains, one connected to the spindle for imparting feeding movements to the slide, and the other connected to said main driving element for imparting high speed movements thereto, a clutch for disconnecting the driving mechanism from the drum including both driving trains, and devices located at the front side of the bed for operating the clutch and for manually rotating the drum when the clutch is disengaged.

47. In a machine tool, a bed having a head provided with a spindle, a slide mounted on the bed, a cam drum for reciprocating the slide, a drum operating shaft extending lengthwise of the bed and gearing connecting it to the drum, means for rotating said shaft including two driving trains, one connected to the spindle for imparting feeding movements, and the other connected to said main driving element for imparting high speed movements, a clutch for disconnecting said shaft from the drum, and devices located at the front side of the bed for operating the clutch and for manually rotating the drum when the clutch is disengaged.

48. In a machine tool, a head having a rotatable spindle, a power shaft carried by the head for rotating the spindle, said shaft being composed of two coaxial parts, a driving member through which power is applied to the machine carried by one of said parts, a power transmitting member for transmitting driving power to the spindle carried by the other of said parts, and a clutch for connecting and disconnecting said two parts of the shaft and located between the driving member and said power transmitting member.

49. In a machine tool, a bed, a head having a rotatable spindle, means for rotating the spindle comprising a main shaft carried by the head and composed of two coaxial parts, a main driving member carried by one of said parts, a power transmitting member carried by the other of said parts and operatively connected to the spindle, a clutch between said members for connecting and disconnecting the said parts of the shaft and comprising a clutch member fixed to the driving part of the shaft, and a movable clutch member slidable on the driven part of the shaft.

50. In a machine tool, a bed having a head provided with a rotatable spindle, means for rotating the spindle comprising a main shaft carried by the head and having a driving part and a driven part coaxial therewith, the latter being provided with a power transmitting member operatively connected to the spindle, a main clutch for connecting and disconnecting said two parts of the shaft and comprising an element fixed to the driving part of the shaft, a stationary braking element fixed to the head, and a movable clutch element adapted to be moved into engagement with either of said first-named elements.

51. In a machine tool, a bed having a head provided with a rotatable spindle, a slide movable along the bed, a main power shaft carried by the head and composed of a driving part and a driven part in coaxial relation, a clutch for connecting and disconnecting said parts, the driven part carrying a power transmitting member for rotating the spindle, and a power transmitting member for operating the slide independently of the spindle.

52. In a machine tool, a bed having a head provided with a rotatable spindle, a main power shaft carried by the head and composed of a driving part and a driven part coaxial therewith, and a clutch for connecting and disconnecting said two parts of the shaft and comprising a clutch member carried by the driving part of the shaft and a movable clutch member and a clutch operating member both slidable on the driven part of the shaft.

In testimony whereof, I hereunto affix my signature.

JOHN J. N. VAN HAMERSVELD.